US011450092B2

(12) United States Patent
Chen

(10) Patent No.: US 11,450,092 B2
(45) Date of Patent: *Sep. 20, 2022

(54) FORGED-PHYSIOLOGICAL-CHARACTERISTIC FILTERING DEVICE OF IDENTITY AUTHENTICATION SYSTEM

(71) Applicant: KeyXentic Inc., Hualien County (TW)

(72) Inventor: Jia-Hong Chen, Taichung (TW)

(73) Assignee: KEYXENTIC INC., Hualien County (TW)

( * ) Notice: Subject to any disclaimer, the term of this patent is extended or adjusted under 35 U.S.C. 154(b) by 159 days.

This patent is subject to a terminal disclaimer.

(21) Appl. No.: 17/004,498

(22) Filed: Aug. 27, 2020

(65) Prior Publication Data

US 2020/0394438 A1 Dec. 17, 2020

Related U.S. Application Data

(62) Division of application No. 16/113,831, filed on Aug. 27, 2018, now Pat. No. 10,762,381.

(30) Foreign Application Priority Data

Aug. 28, 2017 (CN) .......................... 201710750725.6

(51) Int. Cl.
*G06F 21/32* (2013.01)
*G06V 10/75* (2022.01)
(Continued)

(52) U.S. Cl.
CPC ............ *G06V 10/751* (2022.01); *G06F 21/32* (2013.01); *G06V 40/10* (2022.01);
(Continued)

(58) Field of Classification Search
CPC ............... G06V 10/751; G06V 40/197; G06V 40/1365; G06V 40/10; G06V 40/70; G06V 40/15; G06F 21/32

See application file for complete search history.

(56) References Cited

U.S. PATENT DOCUMENTS 6,678,821 B1 1/2004 Waugh et al.
9,836,896 B2 * 12/2017 Zizi .......................... G06F 21/32
(Continued)

FOREIGN PATENT DOCUMENTS

| CN | 106650350 A | 5/2017 |
| TW | 201627914 A | 8/2016 |
| TW | 201633213 A | 9/2016 |

OTHER PUBLICATIONS

Chinese Office Action and Search Report for Chinese Application No. 201710750725.8, dated Oct. 11, 2021, with an English translation of the Search Report.

(Continued)

*Primary Examiner* — Joseph P Hirl
*Assistant Examiner* — Stephen T Gundry
(74) *Attorney, Agent, or Firm* — Birch, Stewart, Kolasch & Birch, LLP

(57) ABSTRACT

A forged-physiological-characteristic filtering device includes: a physiological characteristic scanning circuit for conducting a plurality of times of physiological characteristic scanning operations; a control circuit for acquiring a plurality of unverified-user physiological characteristics and generating a plurality of corresponding unverified-user action records, and for calculating time interval between two consecutive unverified-user physiological characteristics to generate corresponding unverified-user time interval records; and a secure circuit for respectively comparing the plurality of unverified-user physiological characteristics with a plurality of valid-user physiological characteristics, for respectively comparing the plurality of unverified-user action records with a plurality of valid-user action records, and for comparing the unverified-user time interval record with a valid-user time interval record. The secure circuit is allowed to conduct encryption, decryption, or signature (Continued)

operation on data transmitted from a host device only if all of the above comparing operations match with predetermined conditions.

14 Claims, 6 Drawing Sheets

(51) Int. Cl.
    *G06V 40/10*     (2022.01)
    *G06V 40/70*     (2022.01)
    *G06V 40/18*     (2022.01)
    *G06V 40/12*     (2022.01)

(52) U.S. Cl.
    CPC ........ *G06V 40/1365* (2022.01); *G06V 40/197* (2022.01); *G06V 40/70* (2022.01); *G06V 40/15* (2022.01)

(56) References Cited

U.S. PATENT DOCUMENTS

| | | | | |
|---|---|---|---|---|
| 2012/0256725 | A1 | 10/2012 | Hayashi | |
| 2014/0247142 | A1* | 9/2014 | Proud | H04W 4/02 340/870.02 |
| 2014/0247146 | A1* | 9/2014 | Proud | A61B 5/0024 340/870.02 |
| 2014/0247154 | A1* | 9/2014 | Proud | A61B 5/002 340/870.09 |
| 2014/0310804 | A1* | 10/2014 | Apostolos | H04L 63/0861 726/19 |
| 2014/0337930 | A1* | 11/2014 | Hoyos | H04L 63/0861 726/4 |
| 2015/0264045 | A1* | 9/2015 | Blondeau | G06F 21/32 726/5 |
| 2016/0057565 | A1* | 2/2016 | Gold | H04W 4/023 455/41.1 |
| 2016/0174025 | A1* | 6/2016 | Chaudhri | H04B 1/385 455/41.3 |
| 2016/0183812 | A1* | 6/2016 | Zhang | G07C 9/37 600/301 |
| 2016/0220151 | A1* | 8/2016 | Zizi | A61B 5/7235 |
| 2016/0232726 | A1 | 8/2016 | Zizi et al. | |
| 2016/0241554 | A1* | 8/2016 | Zizi | H04L 63/0807 |
| 2016/0342826 | A1* | 11/2016 | Apostolos | H04W 12/065 |
| 2017/0032114 | A1* | 2/2017 | Turgeman | G06F 21/316 |
| 2017/0220843 | A1* | 8/2017 | Apostolos | H04W 12/065 |
| 2017/0346817 | A1* | 11/2017 | Gordon | G06V 40/10 |
| 2017/0373843 | A1 | 12/2017 | Benson et al. | |
| 2018/0012005 | A1* | 1/2018 | Hallock | G06F 21/32 |
| 2018/0020927 | A1* | 1/2018 | Jain | A61B 5/6897 600/494 |
| 2018/0068103 | A1* | 3/2018 | Pitkänen | G06Q 20/40145 |
| 2018/0150690 | A1* | 5/2018 | Yin | A61B 3/0008 |
| 2018/0150691 | A1* | 5/2018 | Wu | G06V 40/19 |
| 2018/0322263 | A1 | 11/2018 | Hallock | |
| 2018/0358113 | A1 | 12/2018 | Cronin et al. | |
| 2019/0050943 | A1 | 2/2019 | Conradie et al. | |
| 2019/0065714 | A1 | 2/2019 | Adams | |
| 2019/0303696 | A1 | 10/2019 | Kawahara et al. | |
| 2019/0332758 | A1 | 10/2019 | Yin et al. | |
| 2019/0342329 | A1 | 11/2019 | Turgeman | |
| 2019/0347386 | A1 | 11/2019 | Rahmel et al. | |

OTHER PUBLICATIONS

Taiwan Patent Office Communication for Application No. 106129224 dated Jul. 31, 2018.

* cited by examiner

FORGED-PHYSIOLOGICAL-CHARACTERISTIC FILTERING DEVICE OF IDENTITY AUTHENTICATION SYSTEM

CROSS-REFERENCE TO RELATED APPLICATIONS

This application is a Divisional of co-pending U.S. patent application Ser. No. 16/113,831, filed on Aug. 27, 2018, which claims the benefit of priority to Patent Application No. 201710750725.6, filed in China on Aug. 28, 2017. The entire contents of which are hereby incorporated by reference for all purposes.

BACKGROUND

The disclosure generally relates to an identity authentication technology and, more particularly, to a forged-physiological-characteristic filtering device for use in an identity authentication system.

In order to prevent identity theft, many identity authentication systems require user's physiological-characteristic (e.g., fingerprint or iris) to be comparison basis, so as to increase the accuracy and non-repudiation of the identity authentication procedure.

However, more and more reports evidences show that a malicious person is able to steal other users' fingerprint, iris, or other physiological characteristics from a neighboring location by using a sophisticated imaging manner. Accordingly, the traditional identity authentication that only compares physiological characteristics is no longer a reliable manner for authenticating the user's identity.

SUMMARY

An example embodiment of a forged-physiological-characteristic filtering device for an identity authentication system is disclosed. The forged-physiological-characteristic filtering device comprises: a communication circuit arranged to operably communicate data with a host device in the identity authentication system; a physiological characteristic scanning circuit arranged to operably conduct a plurality of times of physiological characteristic scanning operations; a control circuit, coupled with the communication circuit and the physiological characteristic scanning circuit, arranged to operably acquire multiple unverified-user physiological characteristics and generate corresponding multiple unverified-user motion records according to scanning results of the physiological characteristic scanning circuit, and also arranged to operably calculate an input time interval between consecutive unverified-user physiological characteristics to generate one or more corresponding unverified-user time interval records, wherein the multiple unverified-user physiological characteristics comprise a first unverified-user physiological characteristic and a second unverified-user physiological characteristic, and the second unverified-user physiological characteristic is a very first physiological characteristic sensed by the physiological characteristic scanning circuit after the first unverified-user physiological characteristic escapes away from a detection range of the physiological characteristic scanning circuit; a prompt circuit, coupled with the control circuit, arranged to operably prompt an unverified-user to move or rotate a specific physiological characteristic being currently scanned during at least one scanning operation or to operably prompt the unverified-user to change a surface moisture of a specific physiological characteristic to be scanned before providing the specific physiological characteristic to be scanned by the physiological characteristic scanning circuit; and a secure circuit coupled with the control circuit and comprising a secured memory for storing a key, multiple valid-user physiological characteristics, multiple valid-user motion records, and one or more valid-user time interval records, wherein the one or more valid-user time interval records comprise a first valid-user time interval record; wherein the secure circuit is arranged to respectively compare the multiple unverified-user physiological characteristics with the multiple valid-user physiological characteristics, to respectively compare the multiple unverified-user motion records with the multiple valid-user motion records, and to respectively compare the one or more unverified-user time interval records with the one or more valid-user time interval records; wherein the control circuit is further arranged to operably calculate an input time interval between the first unverified-user physiological characteristic and the second unverified-user physiological characteristic to generate a corresponding first unverified-user time interval record; the secure circuit is further arranged to operably compare the first unverified-user time interval record with the first valid-user time interval record; and the secure circuit determines that the first unverified-user time interval record does not match with the first valid-user time interval record if a first time length corresponding to the first unverified-user time interval record is less than 70% of a first predetermined time length corresponding to the first valid-user time interval record or greater than 130% of the first predetermined time length; wherein the secure circuit enters into a signature-accessible status only if the multiple unverified-user physiological characteristics respectively match with corresponding valid-user physiological characteristics, the multiple unverified-user motion records respectively match with corresponding valid-user motion records, while the one or more unverified-user time interval records respectively match with corresponding valid-user time interval records; wherein the secure circuit is allowed to conduct encryption, decryption, or signature operation on data transmitted from the host device using the key only when the secure circuit stays in the signature-accessible status.

Another example embodiment of a forged-physiological-characteristic filtering device for an identity authentication system is disclosed. The forged-physiological-characteristic filtering device comprises: a communication circuit arranged to operably communicate with a host device in the identity authentication system; a physiological characteristic scanning circuit arranged to operably conduct a plurality of times of physiological characteristic scanning operations; a control circuit, coupled with the communication circuit and the physiological characteristic scanning circuit, arranged to operably acquire multiple unverified-user physiological characteristics and generate corresponding multiple unverified-user motion records according to scanning results of the physiological characteristic scanning circuit, and also arranged to operably calculate an input time interval between consecutive unverified-user physiological characteristics to generate one or more corresponding unverified-user time interval records, wherein the one or more valid-user time interval records comprise a first valid-user time interval record while the multiple unverified-user physiological characteristics comprise a first unverified-user physiological characteristic and a second unverified-user physiological characteristic, and the second unverified-user physiological characteristic is a very first physiological characteristic sensed by the physiological characteristic scanning circuit after the first unverified-user physiological characteristic escapes away from a detection range of the physiological characteristic scanning circuit; and a prompt circuit, coupled with the control circuit, arranged to operably prompt an unverified-user to move or rotate a specific physiological characteristic being currently scanned during at least one scanning operation or to operably prompt the unverified-user to change a surface moisture of a specific physiological characteristic to be scanned before providing the specific physiological characteristic to be scanned by the physiological characteristic scanning circuit; wherein the control circuit comprises a nonvolatile memory for storing multiple valid-user physiological characteristics, multiple valid-user motion records, and one or more valid-user time interval records, and the control circuit is further arranged to respectively compare the multiple unverified-user physiological characteristics with the multiple valid-user physiological characteristics, to respectively compare the multiple unverified-user motion records with the multiple valid-user motion records, and to respectively compare the one or more unverified-user time interval records with the one or more valid-user time interval records; wherein the control circuit is further arranged to operably calculate an input time interval between the first unverified-user physiological characteristic and the second unverified-user physiological characteristic to generate a corresponding first unverified-user time interval record; arranged to operably compare the first unverified-user time interval record with the first valid-user time interval record; and arranged to operably determine that the first unverified-user time interval record does not match with the first valid-user time interval record if a first time length corresponding to the first unverified-user time interval record is less than 70% of a first predetermined time length corresponding to the first valid-user time interval record or greater than 130% of the first predetermined time length; wherein the control circuit enters into an accessible status only if the multiple unverified-user physiological characteristics respectively match with corresponding valid-user physiological characteristics, the multiple unverified-user motion records respectively match with corresponding valid-user motion records, while the one or more unverified-user time interval records respectively match with corresponding valid-user time interval records; wherein the control circuit is allowed to transmit particular user commands to the host device only when the control circuit stays in the accessible status.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

Figure 1:
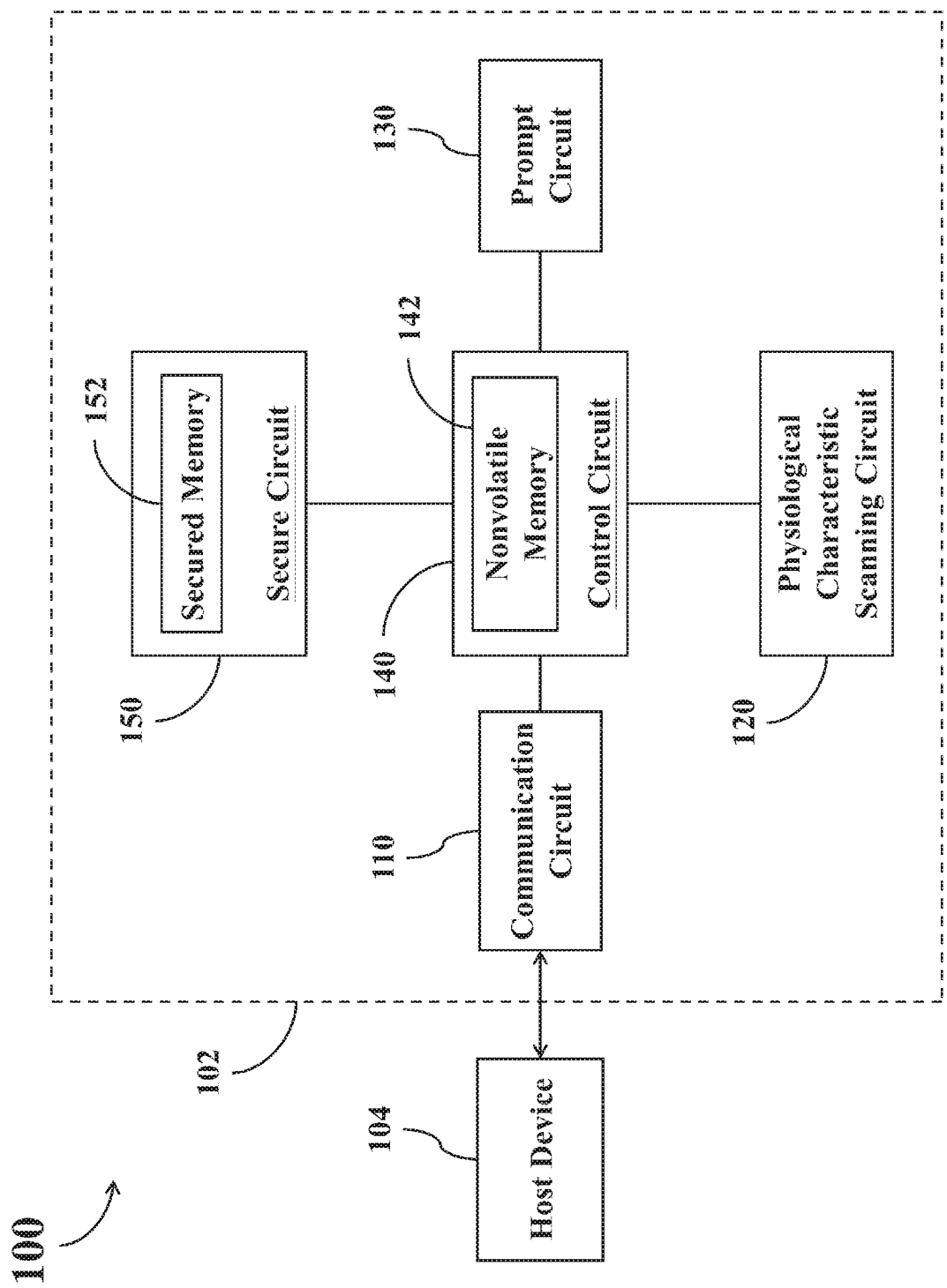
FIG. 1 shows a simplified functional block diagram of an identity authentication system according to one embodiment of the present disclosure.

FIG. 1 shows a simplified functional block diagram of an identity authentication system 100 according to one embodiment of the present disclosure. The identity authentication system 100 comprises a forged-physiological-characteristic filtering device 102 and a host device 104. The forged-physiological-characteristic filtering device 102 may compare user's physiological characteristics and compare records related to user's motions during the physiological characteristics scanning operation in response to the request of the host device 104 or when needed to verify the reality/correctness of user's identity so as to avoid identity theft problem.

In the embodiment of FIG. 1, the forged-physiological-characteristic filtering device 102 comprises a communication circuit 110, a physiological characteristic scanning circuit 120, a prompt circuit 130, a control circuit 140, and a secure circuit 150.

In the forged-physiological-characteristic filtering device 102, the communication circuit 110 is utilized for communicating data with the host device 104. The data communication between the communication circuit 110 and the host device 104 can be realized with various appropriate wired transmission or wireless transmission approaches. In other words, the forged-physiological-characteristic filtering device 102 and the host device 104 may be located at the same place, or may be located in different geographical regions.

The physiological characteristic scanning circuit 120 is arranged to operably conduct multiple times of physiological characteristic scanning operations according to the user's manipulations. The prompt circuit 130 is, according to the instruction of the control circuit 140, arranged to operably prompt the user to provide one or more physiological characteristics for use in the physiological characteristic scanning operations of the physiological characteristic scanning circuit 120 in a certain order and/or cadence.

The control circuit 140 is coupled with the communication circuit 110, the physiological characteristic scanning circuit 120, and the prompt circuit 130. The control circuit 140 is arranged to operably acquire multiple unverified-user physiological characteristics based on the scanning result of the physiological characteristic scanning circuit 120, to operably generate multiple unverified-user motion records respectively corresponding to the multiple unverified-user physiological characteristics, and to operably calculate an input time interval between consecutive unverified-user physiological characteristics to generate one or more corresponding unverified-user time interval records. The control circuit 140 comprises a nonvolatile memory 142 for storing program codes for controlling the operations of the forged-physiological-characteristic filtering device 102 or other important data.

The secure circuit 150 is coupled with the control circuit 140 and comprises a secured memory 152 for storing a valid user's secret or sensitive data and ensuring those secret or sensitive data cannot be easily tampered. For example, the secured memory 152 of this embodiment is arranged to operably store the valid user's cryptography key, multiple valid-user physiological characteristics, multiple valid-user motion records, and one or more valid-user time interval records. The secure circuit 150 is arranged to operably compare the multiple unverified-user physiological characteristics with the aforementioned multiple valid-user physiological characteristics, to operably compare the multiple unverified-user motion records with the aforementioned multiple valid-user motion records, to operably compare the unverified-user time interval record with the aforementioned valid-user time interval record, and to operably decide subsequent operation according to the comparison results.

A dedicated secured data channel may be arranged between the secure circuit 150 and the control circuit 140, so that the secure circuit 150 and the control circuit 140 can conduct transmission of secret or sensitive data with each other through dedicated secured data channel.

The term "physiological characteristic" used throughout the description and the claims refers to various biometric features that can be used in identifying a particular user's identity, such as a fingerprint, a palm print, hand geometry, an iris, a retina, a face, an ear shape, or a vein. The aforementioned physiological characteristic generated by the control circuit 140 or the valid-user physiological characteristic stored in the secure circuit 150, may be realized in the form of a corresponding potential difference record, a thermal entropy record, a gray images, a multi-tone image, a color image, or an invisible specific spectrum image, or may be realized in the form of a digital data generated by performing various known feature algorithms on the previous potential difference record, thermal entropy record, or various image data.

In practice, the communication circuit 110 may be realized with various wired transmission circuits, wireless communication circuits, or a hybrid circuit integrated with above both communication mechanisms. The physiological characteristic scanning circuit 120 may be realized with various sensors that is capable of scanning above physiological characteristic to generate a corresponding scanning result, such as a fingerprint scanner, a plam print scanner, a hand geometry recognizer, an iris scanner, a retina scanner, a digital camera, or a vein recognition device. The prompt circuit 130 may be realized with various display devices capable of displaying texts, graphs, or images, may be realized with various audio playback devices capable of playing vocal data or music, or may be realized with various audio-video playback devices integrated with both video and audio playback functionalities. The control circuit 140 may be realized with various programmable processors with computing and command decoding capabilities. The secure circuit 150 may be realized with various micro-processors or controllers capable of performing cryptographic algorithm computations, conducting key generation and related operations, conducting digital signature algorithm operations, and storing secret/sensitive data. For example, the secure circuit 150 may be realized with various secure micro-controllers, secure chips, smart cards, or hardware secure modules (HSMs) passing through related international data security authentications, so as to ensure the key and secret or sensitive data stored in the secured memory 152 cannot be tampered easily.

Different functional blocks of the identity authentication system 100 may be realized with different circuits, or may be integrated into a single circuit or hardware device. For example, the communication circuit 110, the physiological characteristic scanning circuit 120, the prompt circuit 130, the control circuit 140, and the secure circuit 150 of the forged-physiological-characteristic filtering device 102 may be integrated into the same hardware device outside the host device 104. Alternatively, the forged-physiological-characteristic filtering device 102 and the host device 104 may be integrated into a single hardware device.

In addition, the implementations of the forged-physiological-characteristic filtering device 102 and the host device 104 may be adaptively modified in view of the practical applications of the identity authentication system 100.

For example, in the applications where the identity authentication system 100 is applied to connect to networks for conducting on-line transactions or applied to conduct real-time decryption on particular files so that the particular files can be accessed by the users, the host device 104 may be realized with a desk-top computer, a notebook computer, a tablet computer, a mobile phone, or other appropriate device having networking capabilities, and the forged-physiological-characteristic filtering device 102 may be realized in the format of an appropriate input device compatible to the previously described devices.

For another example, in the applications where the identity authentication system 100 is utilized in a smart door lock, the forged-physiological-characteristic filtering device 102 may be realized in the format of a security key, and the host device 104 may be realized with an appropriate lock control circuit which is installed inside the lock stile and arranged to cooperate with the aforementioned security key.

For another example, in the applications where the identity authentication system 100 is utilized in a smart safe (a.k.a. smart coffer), the forged-physiological-characteristic filtering device 102 may be realized in the format of an input derive of the smart safe, and the host device 104 may be realized with an appropriate lock control circuit which is installed inside the smart safe and arranged to cooperate with the aforementioned input device.

For another example, in the applications where the identity authentication system 100 is utilized in an automated teller machine (ATM), the forged-physiological-characteristic filtering device 102 may be realized in the format of a control panel of the ATM, and the host device 104 may be realized with a control computer inside the ATM.

Before the identity authentication system 100 is utilized to conduct identity authentication, the physiological characteristics of a valid user should be enrolled into the secure circuit 150.

In this embodiment, before enrolling the physiological characteristics of the valid user or at appropriate time points during the enrolling process, the prompt circuit 130 may generate appropriate prompt messages based on the instructions of the control circuit 140 to guide the valid user to perform related actions during the enrolling process.

For example, the prompt circuit 130 may display predetermined texts, display predetermined images, display predetermined videos, playback predetermined vocal messages, or play predetermined music to guide the valid user to provide one or more physiological characteristics required for the physiological characteristic scanning circuit 120 according to a particular order and/or cadence, so that the physiological characteristic scanning circuit 120 can conduct multiple times of physiological characteristic scanning operations. In addition, before enrolling the physiological characteristics of the valid user or at appropriate time points during the enrolling process, the prompt circuit 130 may also generate related prompt messages to prompt the valid user to optionally move or rotate the physiological characteristic being currently scanned in one or more scanning operations.

Based on the instruction of the prompt message generated by the prompt circuit 130, the valid user may contact a particular physiological characteristic (hereinafter, a valid-user physiological characteristic) with the physiological characteristic scanning circuit 120 or align the valid-user physiological characteristic with the scanning region of the physiological characteristic scanning circuit 120 so that the physiological characteristic scanning circuit 120 can scan the valid-user physiological characteristic.

For example, in the embodiment where the physiological characteristic scanning circuit 120 is realized with a fingerprint scanner, the valid user may put a particular finger on the scanning region of the physiological characteristic scanning circuit 120.

For another example, in the embodiment where the physiological characteristic scanning circuit 120 is realized with a plam print scanner or a hand geometry recognizer, the valid user may put a particular palm on the scanning region of the physiological characteristic scanning circuit 120.

For another example, in the embodiment where the physiological characteristic scanning circuit 120 is realized with an iris scanner or a retina scanner, the valid user may align a particular eye with the image sensing element of the physiological characteristic scanning circuit 120.

For another example, in the embodiment where the physiological characteristic scanning circuit 120 is realized with a digital camera, the valid user may align his/her face or a particular ear with the optical sensing element of the physiological characteristic scanning circuit 120.

In one embodiment, the prompt circuit 130 may guide the valid user to provide multiple different physiological characteristics to be scanned by the physiological characteristic scanning circuit 120 in an order assigned by the prompt circuit 130 or in an order decided by the valid user.

For example, the prompt circuit 130 may require the valid user to provide the right hand thumb, the left hand middle finger, and the right hand index finger to be sequentially scanned by the physiological characteristic scanning circuit 120 in order. For another example, the prompt circuit 130 may require the valid user to provide the left hand index finger, the right hand little finger, the left hand index finger, and the right hand middle finger to be sequentially scanned by the physiological characteristic scanning circuit 120 in order. For another example, the prompt circuit 130 may prompt the valid user to provide more than two fingers decided by the valid user to be scanned by the physiological characteristic scanning circuit 120 in order. For another example, the prompt circuit 130 may prompt the valid user to align the left eye, the right eye, and then the left eye again with the physiological characteristic scanning circuit 120, so that the physiological characteristic scanning circuit 120 can conduct three times of iris scanning operations. For another example, the prompt circuit 130 may prompt the valid user to align his/her eyes with the physiological characteristic scanning circuit 120 for more than two times in an order decided by the valid user, so that the physiological characteristic scanning circuit 120 can conduct more than two times of iris scanning operations.

In another embodiment, the prompt circuit 130 may guide the valid user to repeatedly provide the same physiological characteristic selected by the prompt circuit 130 (or selected by the valid user) to the physiological characteristic scanning circuit 120 at multiple different time points according to a certain cadence assigned by the prompt circuit 130 or a certain cadence decided by the valid user, so that the physiological characteristic scanning circuit 120 scans the same physiological characteristic for multiple times.

For example, the prompt circuit 130 may guide the valid user to repeatedly provide a particular finger (e.g., the right hand ring finger, the left hand index finger, the right hand thumb, etc.) selected by the prompt circuit 130 (or selected by the valid user) to the physiological characteristic scanning circuit 120 at multiple time points with a certain time interval assigned by the prompt circuit 130 (or decided by the valid user), so that the physiological characteristic scanning circuit 120 can conduct multiple times of fingerprint scanning operations. For another example, the prompt circuit 130 may play a music selected by the prompt circuit 130 (or selected by the valid user) and prompt the valid user to repeatedly provide a particular finger selected by the prompt circuit 130 (or selected by the valid user) to the physiological characteristic scanning circuit 120 at multiple specific beats of the music, so that the physiological characteristic scanning circuit 120 can conduct multiple times of fingerprint scanning operations.

In another example, the prompt circuit 130 may guide the valid user to provide multiple physiological characteristics to the physiological characteristic scanning circuit 120 at multiple time points according to a certain cadence and order assigned by the prompt circuit 130 or according to a certain cadence and order decided by the user, so that the physiological characteristic scanning circuit 120 respectively scans the multiple physiological characteristics at the multiple time points. The aforementioned multiple physiological characteristics may be identical to each other, or may be a combination of some identical physiological characteristics and some different physiological characteristics.

For example, the prompt circuit 130 may guide the valid user to provide multiple fingers selected by the prompt circuit 130 (or selected by the valid user) to the physiological characteristic scanning circuit 120 at multiple time points in order with a certain time interval assigned by the prompt circuit 130 (or decided by the valid user), so that the physiological characteristic scanning circuit 120 can conduct multiple times of fingerprint scanning operations. For another example, the prompt circuit 130 may playback a music selected by the prompt circuit 130 (or selected by the valid user), and guide the valid user to provide multiple fingers selected by the prompt circuit 130 (or selected by the valid user) to the physiological characteristic scanning circuit 120 for scanning in order at multiple specific beats of the music.

As described previously, the prompt circuit 130 may generate related prompt messages to prompt the valid user to optionally move or rotate the physiological characteristic being currently scanned in one or more scanning courses.

For example, in one or more scanning courses, the prompt circuit 130 may prompt the valid user to move the physiological characteristic being currently scanned by the physiological characteristic scanning circuit 120 along with a moving direction, at a moving speed, with a moving distance, and/or to follow a moving course assigned by the prompt circuit 130 (or selected by the valid user) while keeping the physiological characteristic to be within the sensing range of the physiological characteristic scanning circuit 120.

For another example, in one or more scanning courses, the prompt circuit 130 may prompt the valid user to rotate the physiological characteristic being currently scanned by the physiological characteristic scanning circuit 120 along with a rotating direction, at a rotating speed, with a rotating angle, and/or to follow a rotating course assigned by the prompt circuit 130 (or selected by the valid user) while keeping the physiological characteristic to be within the sensing range of the physiological characteristic scanning circuit 120.

In practice, the valid user may opt to move or rotate the physiological characteristic being currently scanned in every scanning course of the physiological characteristic scanning circuit 120. The valid user may opt to move or rotate the physiological characteristic being currently scanned in only one or some scanning courses of the physiological characteristic scanning circuit 120. Alternatively, the valid user may opt to not move and rotate the physiological characteristic being currently scanned in any scanning course of the physiological characteristic scanning circuit 120.

Figure 2:
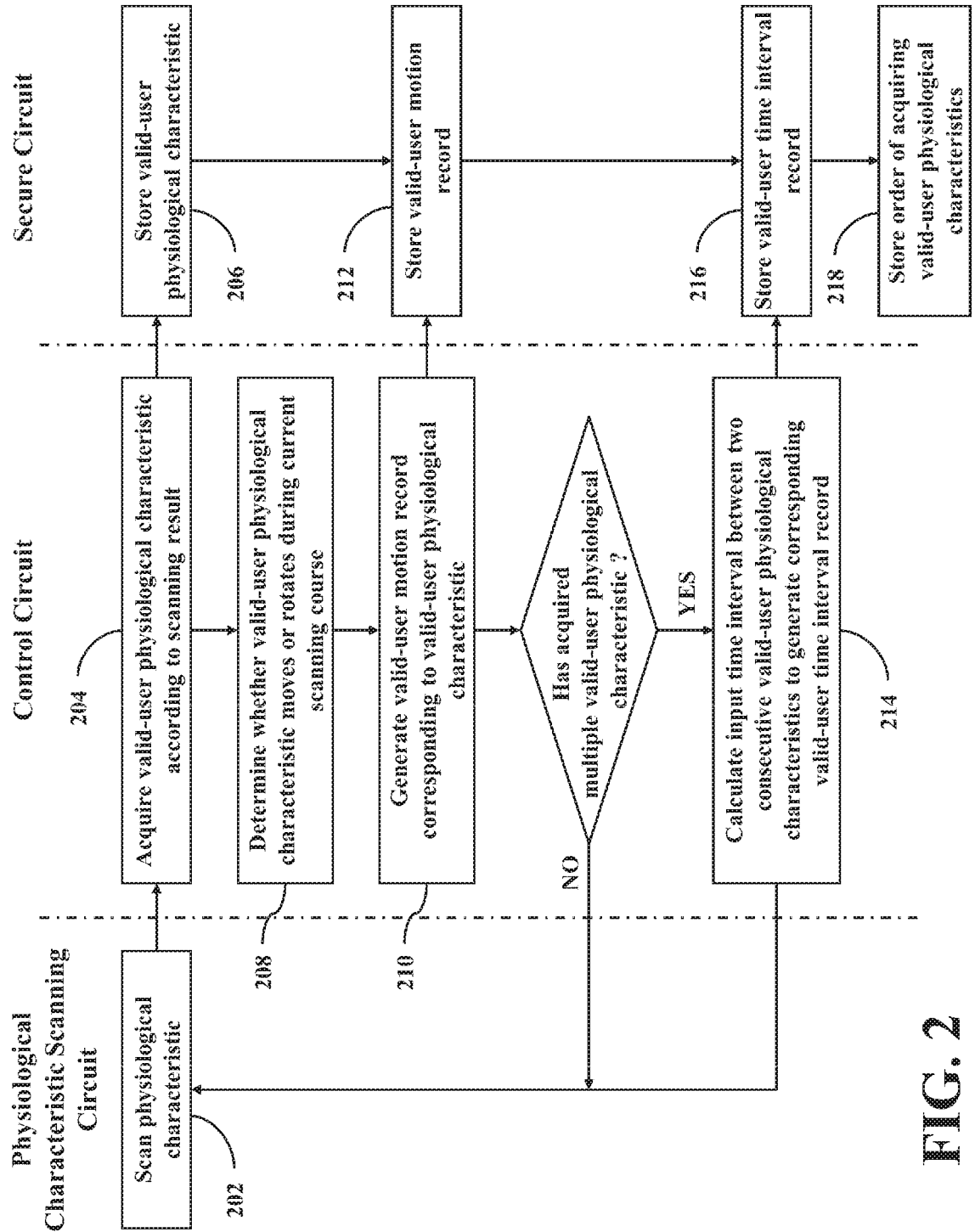
FIG. 2 shows a simplified flowchart of a method of rolling physiological characteristics according to one embodiment of the present disclosure.

The operations of rolling physiological characteristics of the valid user into the secure circuit 150 will be further described in the following by reference to FIG. 2. FIG. 2 shows a simplified flowchart of a method of rolling physiological characteristics according to one embodiment of the present disclosure.

In the flowchart of FIG. 2, operations within a column under the name of a specific device are operations to be performed by the specific device. For example, operations within a column under the label "physiological characteristic scanning circuit" are operations to be performed by the physiological characteristic scanning circuit 120; operations within a column under the label "control circuit" are operations to be performed by the control circuit 140; operations within a column under the label "secure circuit" are operations to be performed by the secure circuit 150; and so forth. The same analogous arrangement also applies to the subsequent flowcharts.

In the operation 202, the physiological characteristic scanning circuit 120 scans the physiological characteristic being currently provided by the valid user (hereinafter, the valid-user physiological characteristic), and transmits the scanning result to the control circuit 140 in the form of various appropriate formats, such as sensing signals, electric potential difference data, entropy data, or the like.

During each scanning course of the physiological characteristic scanning circuit 120, the control circuit 140 also performs the operation 204 to acquire the valid-user physiological characteristic according to the scanning result transmitted from the physiological characteristic scanning circuit 120. In operations, the control circuit 140 may adopt various existing methods to recognize the valid-user physiological characteristic from the scanning result transmitted from the physiological characteristic scanning circuit 120, and then transmit the acquired valid-user physiological characteristic to the secure circuit 150 through the secured data channel described previously.

Please note that the time period corresponding to each scanning course of the physiological characteristic scanning circuit 120 as used throughout the specification and claims refers to a time period, which starts from the time that a physiological characteristic is detected by the physiological characteristic scanning circuit 120 and ends at the time that the physiological characteristic escapes away from a detection range of the physiological characteristic scanning circuit 120. During each scanning course of the physiological characteristic scanning circuit 120, the physiological characteristic scanning circuit 120 may continuously scans the physiological characteristic for multiple times so as to monitor whether the physiological characteristic remains to be within the detectable range.

For example, in the embodiments where the physiological characteristic scanning circuit 120 is realized with contact-type scanner (such as the fingerprint scanner, the plam print scanner, or the hand geometry recognizer), the time period corresponding to each scanning course of the physiological characteristic scanning circuit 120 refers to the period during which the user keeps pressing a particular physiological characteristic (e.g., a fingerprint scanner, a plam print, or the like) on the scanning region of the physiological characteristic scanning circuit 120. Once the user removes the particular physiological characteristic from the scanning region of the physiological characteristic scanning circuit 120 to cause the particular physiological characteristic becomes undetectable by the physiological characteristic scanning circuit 120, the physiological characteristic scanning circuit 120 ends its current scanning course.

For another example, in the embodiments where the physiological characteristic scanning circuit 120 is realized with non-contact type scanner (such as the iris scanner, the retina scanner, or the digital camera), the time period corresponding to each scanning course of the physiological characteristic scanning circuit 120 refers to the period during which keeps having a particular physiological characteristic (e.g., the iris, the retina, or the face) to be within the image extracting range of the physiological characteristic scanning circuit 120. Once the user moves the particular physiological characteristic to outside the image extracting range of the physiological characteristic scanning circuit 120, the physiological characteristic scanning circuit 120 ends its current scanning course.

Accordingly, if a physiological characteristic is detected by the physiological characteristic scanning circuit 120 since a time point Tb, and the physiological characteristic escapes from the detectable range of the physiological characteristic scanning circuit 120 at a time point Te, then the time period corresponding to current scanning course of the physiological characteristic scanning circuit 120 refers to the period from the time point Tb to the time point Te.

In the operation 206, the secure circuit 150 may store the valid-user physiological characteristic in the secured memory 152.

It can be appreciated from the foregoing descriptions that the valid user may move or rotate the valid-user physiological characteristic during the scanning course of the physiological characteristic scanning circuit 120. Therefore, in addition to acquire the valid-user physiological characteristic, the control circuit 140 also performs the operations 208 and 210 during each scanning course of the physiological characteristic scanning circuit 120.

In the operation 208, the control circuit 140 may determine whether the valid-user physiological characteristic moves or rotates during the current scanning course of the physiological characteristic scanning circuit 120 based on the scanning results transmitted from the physiological characteristic scanning circuit 120. If the valid-user physiological characteristic moves or rotates, the control circuit 140 may also detect the motion pattern of the valid-user physiological characteristic based on the scanning results of the physiological characteristic scanning circuit 120.

In the operation 210, the control circuit 140 may generate a motion record (hereinafter, a valid-user motion record) corresponding to the valid-user physiological characteristic based on the aforementioned determining result and/or detecting result. The aforementioned motion pattern may encompass (but not limited to) information regarding whether the valid-user physiological characteristic moves or rotates during the current scanning course, the moving direction of the valid-user physiological characteristic, the moving speed of the valid-user physiological characteristic, the moving distance of the valid-user physiological characteristic, the moving course of the valid-user physiological characteristic, the rotating direction of the valid-user physiological characteristic, the rotating speed of the valid-user physiological characteristic, the rotating angle of the valid-user physiological characteristic, or the rotation course of the valid-user physiological characteristic.

The term "motion record" used throughout the description and the claims refers to the data that can be utilized for indicating a portion of or all of the motion patterns of a certain physiological characteristic during the current scanning course, wherein the data may be represented in various appropriate data formats. In practice, the control circuit 140 may record the contents of one or more items in the aforementioned motion patterns to be a corresponding motion record in any appropriate data format.

For example, the control circuit 140 may simply record the determination result of whether the valid-user physiological characteristic moves or rotates during the current scanning course to be a valid-user motion record corresponding to the valid-user physiological characteristic.

For another example, the control circuit 140 may record the information of the moving direction of the valid-user physiological characteristic, the moving speed of the valid-user physiological characteristic, the moving distance of the valid-user physiological characteristic, and/or a portion of or the entire moving course of the valid-user physiological characteristic to be the valid-user motion record corresponding to the valid-user physiological characteristic in the case where the valid-user physiological characteristic moves during the current scanning course.

For another example, the control circuit 140 may record the information of the rotating direction of the valid-user physiological characteristic, the rotating speed of the valid-user physiological characteristic, the rotating angle of the valid-user physiological characteristic, and/or a portion of or the entire rotation course of the valid-user physiological characteristic to be the valid-user motion record corresponding to the valid-user physiological characteristic in the case where the valid-user physiological characteristic rotates during the current scanning course.

For another example, the control circuit 140 may record the information of the moving direction of the valid-user physiological characteristic, the moving speed of the valid-user physiological characteristic, the moving distance of the valid-user physiological characteristic, a portion of or the entire moving course of the valid-user physiological characteristic, the rotating direction of the valid-user physiological characteristic, the rotating speed of the valid-user physiological characteristic, the rotating angle of the valid-user physiological characteristic, and a portion of or the entire rotation course of the valid-user physiological characteristic to be the valid-user motion record corresponding to the valid-user physiological characteristic regardless whether the valid-user physiological characteristic moves or rotates during the current scanning course.

If the control circuit 140 records more motion patterns in the valid-user motion record, the process that the valid user moves or rotates the valid-user physiological characteristic during the current scanning course can be represented more detailed.

The control circuit 140 may transmit the valid-user motion record corresponding to the valid-user physiological characteristic to the secure circuit 150 through the aforementioned secured data channel.

In the operation 212, the secure circuit 150 may store the valid-user motion record in the secured memory 152, and may also store a mapping relationship between the valid-user motion record and related valid-user physiological characteristic in the secured memory 152.

As described previously, when the physiological characteristic scanning circuit 120 or the control circuit 140 has detected that the physiological characteristic being currently scanned by the physiological characteristic scanning circuit 120 escapes from the detectable range of the physiological characteristic scanning circuit 120, the physiological characteristic scanning circuit 120 ends the current scanning course and waits for the next physiological characteristic.

Afterwards, the valid user may, based on the prompt of the prompt circuit 130, provide related physiological characteristics to the physiological characteristic scanning circuit 120 for conducting subsequent scanning courses. Each time the physiological characteristic scanning circuit 120 detects the occurrence of a valid-user physiological characteristic provided by the valid user, the physiological characteristic scanning circuit 120, the control circuit 140, and the secure circuit 150 may repeat the aforementioned operations 202 through 212 on the valid-user physiological characteristic currently provided by the valid user.

For example, assuming that the control circuit 140 acquires a first valid-user physiological characteristic, a second valid-user physiological characteristic, a third valid-user physiological characteristic, and a forth valid-user physiological characteristic in order based on the scanning results of the physiological characteristic scanning circuit 120, the control circuit 140 may generate a first valid-user motion record, a second valid-user motion record, a third valid-user motion record, and a fourth valid-user motion record respectively corresponding to the first through the fourth valid-user physiological characteristics based on the scanning results of the physiological characteristic scanning circuit 120. The secure circuit 150 may store the first, the second, the third, and the fourth valid-user physiological characteristics in the secured memory 152. In addition, the secure circuit 150 may store the first, the second, the third, and the fourth valid-user motion records in the secured memory 152, and may also store the mapping relationship between each valid-user motion record and corresponding valid-user physiological characteristic in the secured memory 152.

As shown in FIG. 2, after the control circuit 140 acquired multiple valid-user physiological characteristics or all required valid-user physiological characteristics by repeating the related operations described previously, the control circuit 140 may proceed with the operation 214 to calculate the input time interval between every two consecutive valid-user physiological characteristics to generate corresponding time interval records (hereinafter, the valid-user time interval records).

In the previous embodiment, for example, the control circuit 140 may calculate the input time interval between the first and the second valid-user physiological characteristics to generate a first predetermined time length; calculate the input time interval between the second and the third valid-user physiological characteristics to generate a second predetermined time length; and calculate the input time interval between the third and the fourth valid-user physiological characteristics to generate a third predetermined time length.

The term "input time interval between consecutive physiological characteristics" used throughout the description and the claims refers to the time difference between a time point at which a physiological characteristic is sensed by the physiological characteristic scanning circuit 120 and a time point at which the next physiological characteristic is sensed by the physiological characteristic scanning circuit 120.

The term "time interval record" used throughout the description and the claims refers to the data that can be utilized for representing the input time interval between two consecutive physiological characteristics, wherein the data may be represented in various appropriate data formats. In practice, the control circuit 140 may adopt various time length calculation approaches to calculate the input time interval between two consecutive physiological characteristics.

For illustrative purpose, it is assumed herein that a first physiological characteristic is detected by the physiological characteristic scanning circuit 120 since a time point T1, the first physiological characteristic escapes from the detectable range of the physiological characteristic scanning circuit 120 at a time point T2, a second physiological characteristic is detected by the physiological characteristic scanning circuit 120 since a time point T3, and the second physiological characteristic escapes from the detectable range of the physiological characteristic scanning circuit 120 at a time point T4.

For example, the control circuit 140 may calculate the time length from the time point T1 to the time point T3 to be the input time interval between the first physiological characteristic and the second physiological characteristic. For another example, the control circuit 140 may calculate the time length from the time point T2 to the time point T3 to be the input time interval between the first physiological characteristic and the second physiological characteristic. For another example, the control circuit 140 may calculate the time length from the time point T2 to the time point T4 to be the input time interval between the first physiological characteristic and the second physiological characteristic.

In the previous embodiment, the control circuit 140 may generate a first valid-user time interval record corresponding to the input time interval between the first and the second valid-user physiological characteristics; a second valid-user time interval record corresponding to the input time interval between the second and the third valid-user physiological characteristics; and a third valid-user time interval record corresponding to the input time interval between the third and the fourth valid-user physiological characteristic.

The control circuit 140 may transmit all of the resulting valid-user time interval records to the secure circuit 150 through the secured data channel described previously.

In the operation 216, the secure circuit 150 may store the valid-user time interval record generated by the control circuit 140 in the secured memory 152.

In the operation 218, the secure circuit 150 may store the order of the valid-user physiological characteristics acquired by the control circuit 140 in the secured memory 152. In practice, the secure circuit 150 may derivate the acquiring order of those valid-user physiological characteristics according to the order that those valid-user physiological characteristics are transmitted from the control circuit 140 to the secure circuit 150. Alternatively, the control circuit 140 may utilize appropriate approach to inform the secure circuit 150 of the acquiring order of the valid-user physiological characteristic.

In addition, the secure circuit 150 may establish a corresponding timing relationship among multiple valid-user motion records based on the acquiring order of the aforementioned valid-user physiological characteristics, and store the timing relationship among the valid-user motion records in the secured memory 152. Similarly, the secure circuit 150 may establish a corresponding timing relationship among multiple valid-user time interval records based on the acquiring order of the aforementioned valid-user physiological characteristics, and store the timing relationship among the valid-user time interval records in the secured memory 152.

By adopting the method of rolling physiological characteristics of FIG. 2, the forged-physiological-characteristic filtering device 102 rolls multiple valid-user physiological characteristics of the valid user in order, and stores the multiple valid-user physiological characteristics in the secure circuit 150 for use in the user identity authentication procedure. Additionally, the forged-physiological-characteristic filtering device 102 also stores the data related to the valid user's behavior features, such as multiple valid-user motion records, one or more valid-user time interval records, and acquiring order of the valid-user physiological characteristics, in the secure circuit 150.

Please note that the executing order of the aforementioned operations in FIG. 2 is merely an exemplary embodiment, rather than a restriction to the practical implementations. For example, the operation 206 may be instead performed after the operation 210 or 214; the operation 212 may be performed after the operation 214. In addition, the operations 206 and 212 may be performed simultaneously with the operation 216, or may be performed after the operation 216.

Afterwards, when someone wants to conduct related action that requires the user to pass the identity authentication procedure (e.g., manipulating the host device 104, activating the host device 104, accessing the host device 104, communicating data with the host device 104, executing commands transmitted from the host device 104, encrypting data generated by the host device 104, decrypting data generated by the host device 104, performing signature operation on data generated by the host device 104, or the like), the forged-physiological-characteristic filtering device 102 can be employed to authenticate the reality/correctness of the identity of the user (hereinafter, the unverified user) based on the data stored by the secure circuit 150 in the aforementioned physiological characteristic rolling operations.

In practice, the prompt circuit 130 may generate prompt messages according to the instructions of the control circuit 140, so as to prompt the unverified user to provide one or more physiological characteristics for use in the physiological characteristic scanning operations of the physiological characteristic scanning circuit 120 in a certain order and/or cadence memorized by the unverified user.

The identity authentication system 100 may adopt a challenge-response mechanism to authenticate the reality/correctness of the identity of the unverified user. For example, it may utilize the prompt circuit 130 to generate multiple challenge messages, and require the unverified user to respond by providing related physiological characteristics to be scanned by the physiological characteristic scanning circuit 120 according to the challenge messages. Then, the forged-physiological-characteristic filtering device 102 may determine whether the physiological characteristics provided by the unverified user and the unverified user's behaviors when providing those physiological characteristics match with the data stored in the secure circuit 150 to thereby verify the reality/correctness of the identity of the unverified user.

In operations, the forged-physiological-characteristic filtering device 102 may respectively compare the multiple physiological characteristics provided by the unverified user with corresponding valid-user physiological characteristics stored in the secure circuit 150, and may compare the unverified user's behavior features when providing those physiological characteristics with related records stored in the secure circuit 150, so as to verify the reality/correctness of the identity of the unverified user.

Figure 3:
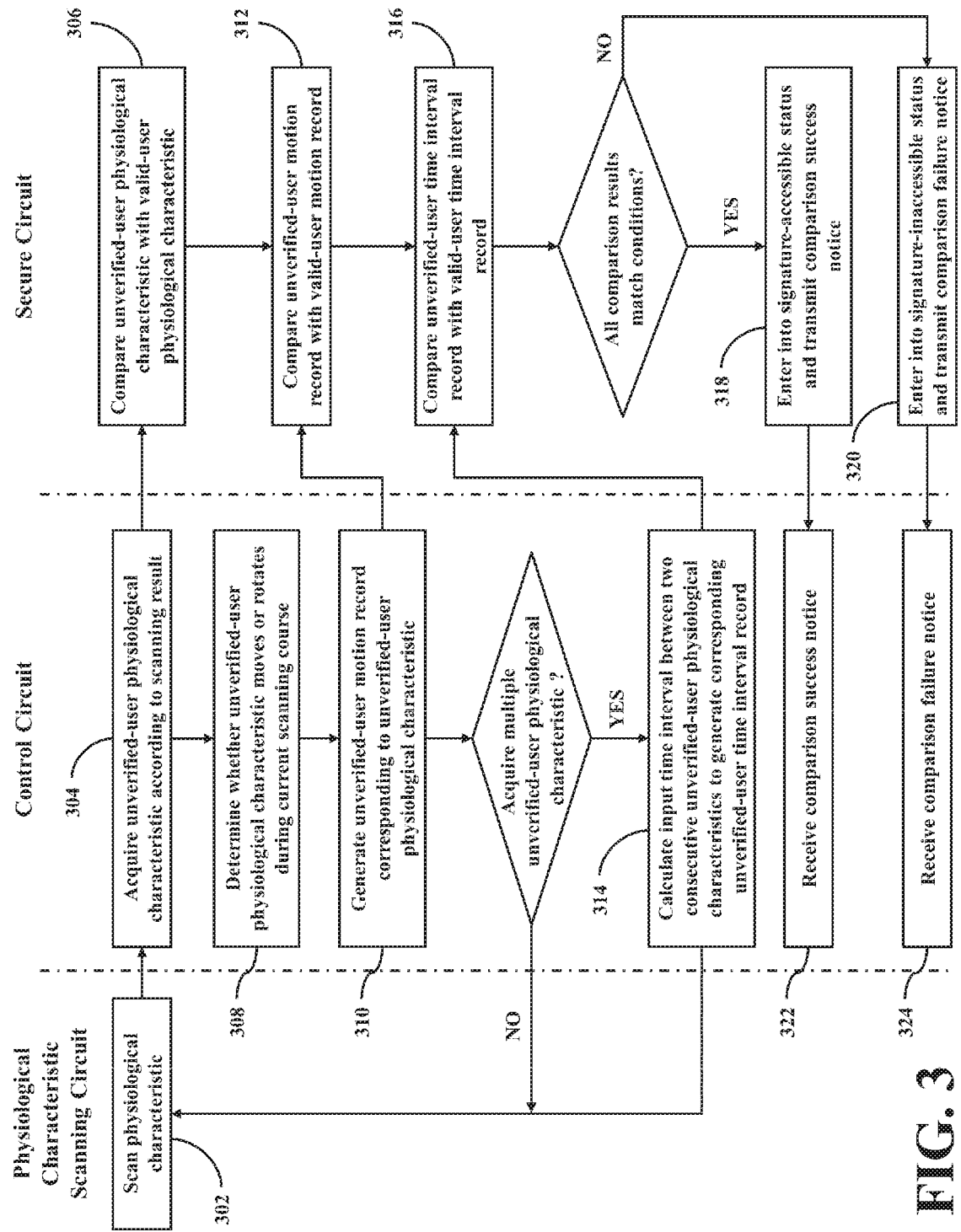
FIG. 3 shows a simplified flowchart of an identity authentication method according to one embodiment of the present disclosure.

The operations of authenticating the reality/correctness of the identity of the unverified user will be further described in the following by reference to FIG. 3. FIG. 3 shows a simplified flowchart of an identity authentication method according to one embodiment of the present disclosure.

In the operation 302, the physiological characteristic scanning circuit 120 may scan the physiological characteristics being currently provided by the unverified user (hereinafter, the unverified-user physiological characteristic), and transmit the scanning results to the control circuit 140 in the form of various appropriate formats, such as sensing signals, electric potential difference data, entropy data, or the like.

During each scanning course of the physiological characteristic scanning circuit 120, the control circuit 140 also performs the operation 304 to acquire the unverified-user physiological characteristic according to the scanning result transmitted from the physiological characteristic scanning circuit 120. In operations, the control circuit 140 may adopt various existing methods to recognize the unverified-user physiological characteristic from the scanning result transmitted from the physiological characteristic scanning circuit 120, and then transmit the acquired unverified-user physiological characteristic to the secure circuit 150 through the secured data channel described previously.

In the operation 306, the secure circuit 150 may compare the unverified-user physiological characteristic with corresponding valid-user physiological characteristic stored in the secured memory 152. The secure circuit 150 may adopt various existing physiological characteristic matching algorithms to determine whether the unverified-user physiological characteristic is identical to or sufficiently similar with the corresponding valid-user physiological characteristic.

Additionally, since the unverified user may move or rotate the unverified-user physiological characteristic during the scanning course of the physiological characteristic scanning circuit 120, the control circuit 140 would also perform the operations 308 and 310 during each scanning course of the physiological characteristic scanning circuit 120 in addition to acquire the unverified-user physiological characteristic.

In the operation 308, the control circuit 140 may determine whether the unverified-user physiological characteristic moves or rotates during the current scanning course of the physiological characteristic scanning circuit 120 based on the scanning results transmitted from the physiological characteristic scanning circuit 120. If the unverified-user physiological characteristic moves or rotates, the control circuit 140 would detect the motion pattern of the unverified-user physiological characteristic based on the scanning results of the physiological characteristic scanning circuit 120.

In the operation 310, the control circuit 140 may generate a motion record (hereinafter, the unverified-user motion record) corresponding to the unverified-user physiological characteristic based on the aforementioned determining result and/or detecting result. The aforementioned motion pattern may encompass (but not limited to) information regarding whether the unverified-user physiological characteristic moves or rotates during the current scanning course, the moving direction of the unverified-user physiological characteristic, the moving speed of the unverified-user physiological characteristic, the moving distance of the unverified-user physiological characteristic, the moving course of the unverified-user physiological characteristic, the rotating direction of the unverified-user physiological characteristic, the rotating speed of the unverified-user physiological characteristic, the rotating angle of the unverified-user physiological characteristic, or the rotation course of the unverified-user physiological characteristic.

For example, the control circuit 140 may simply record the determining result of whether the unverified-user physiological characteristic moves or rotates during the current scanning course to be an unverified-user motion record corresponding to the unverified-user physiological characteristic.

For another example, the control circuit 140 may record the information of the moving direction of the unverified-user physiological characteristic, the moving speed of the unverified-user physiological characteristic, the moving distance of the unverified-user physiological characteristic, and/or a portion of or the entire moving course of the unverified-user physiological characteristic to be the unverified-user motion record corresponding to the unverified-user physiological characteristic in the case where the unverified-user physiological characteristic moves during the current scanning course.

For another example, the control circuit 140 may record the information of the rotating direction of the unverified-user physiological characteristic, the rotating speed of the unverified-user physiological characteristic, the rotating angle of the unverified-user physiological characteristic, and/or a portion of or the entire rotation course of the unverified-user physiological characteristic to be the unverified-user motion record corresponding to the unverified-user physiological characteristic in the case where the unverified-user physiological characteristic rotates during the current scanning course.

For another example, the control circuit 140 may record the information of the moving direction of the unverified-user physiological characteristic, the moving speed of the unverified-user physiological characteristic, the moving distance of the unverified-user physiological characteristic, a portion of or the entire moving course of the unverified-user physiological characteristic, the rotating direction of the unverified-user physiological characteristic, the rotating speed of the unverified-user physiological characteristic, the rotating angle of the unverified-user physiological characteristic, and a portion of or the entire rotation course of the unverified-user physiological characteristic to be the unverified-user motion record corresponding to the unverified-user physiological characteristic regardless whether the unverified-user physiological characteristic moves or rotates during the current scanning course.

If the control circuit 140 records more motion patterns in the unverified-user motion record, the process that the unverified user moves or rotates the unverified-user physiological characteristic during the current scanning course can be represented more detailed.

The control circuit 140 may transmit the unverified-user motion record corresponding to the unverified-user physiological characteristic to the secure circuit 150 through the aforementioned secured data channel.

In the operation 312, the secure circuit 150 may compare the unverified-user motion record with corresponding valid-user motion record stored in the secured memory 152. In operations, the secure circuit 150 may compare the contents of respective motion patterns recorded in the unverified-user motion record with the contents of the motion patterns recorded in the corresponding valid-user motion record.

In one embodiment, the secure circuit 150 determines that the unverified-user motion record matches with the corresponding valid-user motion record as long as more than a predetermined quantity of motion patterns in the unverified-user motion record has identical or sufficiently similar contents as the corresponding motion patterns in the valid-user motion record.

For example, the secure circuit 150 may determine that the unverified-user motion record matches with the corresponding valid-user motion record if more than half motion patterns in the unverified-user motion record have identical or sufficiently similar contents as the corresponding motion patterns in the valid-user motion record.

For another example, the secure circuit 150 may determine that the unverified-user motion record matches with the corresponding valid-user motion record only if more than two-third motion patterns in the unverified-user motion record have identical or sufficiently similar contents as the corresponding motion patterns in the valid-user motion record.

In practice, the secure circuit 150 may further increase the threshold of the aforementioned predetermined quantity to increase the accuracy of the user identity authentication operations. For example, in another embodiment, the secure circuit 150 would determine that the unverified-user motion record matches with the corresponding valid-user motion record only if more than ninety percentages of (or all of) the motion patterns in the unverified-user motion record have identical or sufficiently similar contents as the corresponding motion patterns in the valid-user motion record.

As described previously, when the physiological characteristic scanning circuit 120 or the control circuit 140 has detected that the physiological characteristic being currently scanned by the physiological characteristic scanning circuit 120 escapes from the detectable range of the physiological characteristic scanning circuit 120, the physiological characteristic scanning circuit 120 ends the current scanning course and waits for the next physiological characteristic.

Afterwards, the unverified user can successively provide related physiological characteristics to the physiological characteristic scanning circuit 120 for conducting subsequent scanning courses. Each time the physiological characteristic scanning circuit 120 has sensed an unverified-user physiological characteristic provided by the unverified user, the physiological characteristic scanning circuit 120, the control circuit 140, and the secure circuit 150 may repeat the aforementioned operations 302 through 312 on the unverified-user physiological characteristic being currently provided by the unverified user.

For example, assuming that the control circuit 140 acquires a first unverified-user physiological characteristic, a second unverified-user physiological characteristic, a third unverified-user physiological characteristic, and a forth unverified-user physiological characteristic in order based on the scanning results of the physiological characteristic scanning circuit 120, the control circuit 140 may generate a first unverified-user motion record, a second unverified-user motion record, a third unverified-user motion record, and a fourth unverified-user motion record respectively corresponding to the first through the fourth unverified-user physiological characteristics based on the scanning results of the physiological characteristic scanning circuit 120.

In this situation, the secure circuit 150 may respectively compare the first, the second, the third, and the fourth unverified-user physiological characteristics with the first, the second, the third, and the fourth valid-user physiological characteristics stored in the secured memory 152. In addition, the secure circuit 150 may respectively compare the first, the second, the third, and the fourth unverified-user motion records with the first, the second, the third, and the fourth valid-user motion records stored in the secured memory 152.

As shown in FIG. 3, after the control circuit 140 acquired multiple unverified-user physiological characteristics or all required unverified-user physiological characteristics by repeating the related operations described previously, the control circuit 140 may proceed with the operation 314 to calculate the input time interval between every two consecutive unverified-user physiological characteristics to generate corresponding time interval records (hereinafter, the unverified-user time interval records).

In the previous embodiment, for example, the control circuit 140 may calculate the input time interval between the first and the second unverified-user physiological characteristics to generate a first time length; calculate the input time interval between the second and the third unverified-user physiological characteristics to generate a second time length; and calculate the input time interval between the third and the fourth unverified-user physiological characteristics to generate a third time length.

Similar to the aforementioned embodiment of FIG. 2, the control circuit 140 may adopt various time length calculation approaches to calculate the input time interval between two consecutive unverified physiological characteristics. For sake of simplicity, different embodiments of calculating the input time interval between two consecutive physiological characteristics conducted by the control circuit 140 will not be repeated here.

In the previous embodiment, the control circuit 140 may generate a first unverified-user time interval record corresponding to the input time interval between the first and the second unverified-user physiological characteristics; a second unverified-user time interval record corresponding to the input time interval between the second and the third unverified-user physiological characteristics; and a third unverified-user time interval record corresponding to the input time interval between the third and the fourth unverified-user physiological characteristic.

The control circuit 140 may transmit all of the resulting unverified-user time interval records to the secure circuit 150 through the secured data channel described previously.

In the operation 316, the secure circuit 150 may compare the unverified-user time interval records generated by the control circuit 140 with corresponding valid-user time interval records stored in the secured memory 152. For example, the secure circuit 150 may respectively compare the first, the second, and the third unverified-user time interval records mentioned above with the first, the second, and the third valid-user time interval records stored in the secured memory 152.

When the secure circuit 150 compares a certain unverified-user time interval record with a corresponding valid-user time interval record stored in the secured memory 152, the secure circuit 150 may compare a time length corresponding to the unverified-user time interval record with a time length corresponding to the valid-user time interval record.

For example, when the secure circuit 150 compares the first unverified-user time interval record with the first valid-user time interval record, the secure circuit 150 may compare a first time length corresponding to the first unverified-user time interval record with a first predetermined time length corresponding to the first valid-user time interval record. In one embodiment, the secure circuit 150 would determine that the first unverified-user time interval record matches with the first valid-user time interval record only if the first time length is within the range from 70% to 130% of the first predetermined time length. If the first time length is less than 70% of the first predetermined time length or greater than 130% of the first predetermined time length, the secure circuit 150 would determine that the first unverified-user time interval record does not match with the first valid-user time interval record.

In practice, the secure circuit 150 may lower the tolerance range of the above time interval record comparison to increase the accuracy of the user identity authentication operations. For example, in another embodiment, the secure circuit 150 would determine that the first unverified-user time interval record matches with the first valid-user time interval record only if the first time length is within the range from 85% to 115% of the first predetermined time length. If the first time length is less than 85% of the first predetermined time length or greater than 115% of the first predetermined time length, the secure circuit 150 would determine that the first unverified-user time interval record does not match with the first valid-user time interval record.

It can be appreciated from the foregoing descriptions that in the user identity authentication process, the control circuit 140 acquires multiple unverified-user physiological characteristics and generates corresponding multiple unverified-user motion records based on the scanning results of the physiological characteristic scanning circuit 120. The control circuit 140 also calculates the input time interval between every two consecutive unverified-user physiological characteristics to generate one or more corresponding unverified-user time interval records. The secure circuit 150 respectively compares the multiple unverified-user physiological characteristics acquired by the control circuit 140 with the multiple valid-user physiological characteristics stored in the secured memory 152; respectively compares the multiple unverified-user motion records generated by the control circuit 140 with the multiple valid-user motion records stored in the secured memory 152; and respectively compares the one or more unverified-user time interval records generated by the control circuit 140 with the one or more valid-user time interval records stored in the secured memory 152.

As shown in FIG. 3, the secure circuit 150 would perform the operation 318 only if the multiple unverified-user physiological characteristics respectively match with the multiple valid-user physiological characteristics stored in the secure circuit 150, the multiple unverified-user motion records respectively match with the multiple valid-user motion records stored in the secure circuit 150, and the unverified-user time interval records respectively match with corresponding valid-user time interval records stored in the secure circuit 150.

On the contrary, if any unverified-user physiological characteristic does not match with the corresponding valid-user physiological characteristic, any unverified-user motion record does not match with the corresponding valid-user motion record, or any unverified-user time interval record does not match with the corresponding valid-user time interval record, the secure circuit 150 would proceed with the operation 320.

In the operation 318, the secure circuit 150 enters into a signature-accessible status and transmits a comparison success notice to the control circuit 140.

In the operation 320, the secure circuit 150 enters into a signature-inaccessible status and transmits a comparison failure notice to the control circuit 140.

In the operation 322, the control circuit 140 receives the comparison success notice transmitted from the secure circuit 150 and may report to the host device 104.

In the operation 324, the control circuit 140 receives the comparison failure notice transmitted from the secure circuit 150 and may report to the host device 104. In this situation, the host device 104 may reject the subsequent manipulation request from the unverified user.

Please note that in the identity authentication system 100, the control circuit 140 is allowed to issue some sensitive user commands to the host device 104 only when the secure circuit 150 stays in the signature-accessible status. The secure circuit 150 is allowed to process the identity authentication request transmitted from the control circuit 140 or the host device 104 only when the secure circuit 150 stays in the signature-accessible status. The secure circuit 150 is allowed to conduct encryption, decryption, or signature operation on data transmitted from the host device 104 using the key only when the secure circuit 150 stays in the signature-accessible status.

In some embodiments, the secure circuit 150 would process the identity authentication request transmitted from the control circuit 140 or the host device 104 only when the secure circuit 150 stays in the signature-accessible status. For example, the secure circuit 150 may use the key stored in the secured memory 152 to conduct a signature operation in response to the request from the control circuit 140, and transmit the resulting signature value to the host device 104 through the control circuit 140. Once the signature value passed the verification of the host device 104, the host device 104 would confirm the reality/correctness of unverified user's identity, and then conduct subsequent operations according to the commands issued by the user, such as utilizing the host device 104, activating the host device 104, accessing the host device 104, communicating date with the host device 104, executing specific commands transmitted from the host device 104, encrypting data generated by the host device 104, decrypting data generated by the host device 104, performing signature operation on data generated by the host device 104, or the like.

For another example, in some embodiments, the secure circuit 150 allows the control circuit 140 to transmit commands related to using the host device 104, commands related to activating the host device 104, commands related to accessing the host device 104, or specific data communication request to the host device 104 according to the user's manipulation only when the secure circuit 150 stays in the signature-accessible status.

On the contrary, when the secure circuit 150 stays in the signature-inaccessible status, the secure circuit 150 disallows the control circuit 140 to issue some sensitive user commands to the host device 104; refuses any identity authentication request transmitted from the control circuit 140 or the host device 104; and refuses to conduct encryption, decryption, or signature operation on data transmitted from the host device 104 using the key. For example, in this period, if the host device 104 transmits a signature request to the secure circuit 150 through the control circuit 140 to request the secure circuit 150 for conducting a signature operation on specific data, the secure circuit 150 would reject or ignore the signature request. In this situation, the host device 104 is unable to execute some commands that require authenticating the user's identity again.

For another example, in some embodiments, when the secure circuit 150 stays in the signature-inaccessible status, the secure circuit 150 disallows the control circuit 140 to transmit commands related to using the host device 104, commands related to activating the host device 104, commands related to accessing the host device 104, or specific data communication requests to the host device 104 according to the user's manipulation.

It can be appreciated from the foregoing described previously, if any one of the multiple physiological characteristics provided by the unverified user is forged, the order and/or cadence that the unverified user inputted those physiological characteristics is incorrect, or any one of the multiple physiological characteristic is incorrectly moved or rotated by the unverified user, then the forged-physiological-characteristic filtering device 102 would determine that the unverified user is an invalid user, and would not recognize the reality/correctness of the identity of the unverified user.

Please note that the executing order of the aforementioned operations in FIG. 3 is merely an exemplary embodiment, rather than a restriction to the practical implementations. For example, the operation 306 may be instead performed after the operation 310 or 314; the operation 312 may be performed after the operation 314. In addition, the operations 306 and 312 may be performed simultaneously with the operation 316, or may be performed after the operation 316.

In addition, the aforementioned operations 306, 312, and 316 may not be performed in every user identity authentication operations.

For example, the secure circuit 150 may perform the operation 306 first and then respectively compare the multiple unverified-user motion records with the multiple valid-user motion records (operation 312) or respectively compare the one or more unverified-user time interval records with the one or more valid-user time interval records (operation 316) only if the multiple unverified-user physiological characteristics respectively match with the corresponding valid-user physiological characteristics. If the secure circuit 150 determines that any unverified-user physiological characteristic does not match with the corresponding valid-user physiological characteristic, the secure circuit 150 can skip the operations 312 and 316, and proceed with the operation 320.

For another example, the secure circuit 150 may perform the operation 312 first and then respectively compare the multiple unverified-user physiological characteristics with the multiple valid-user physiological characteristics (operation 306) or respectively compare the one or more unverified-user time interval records with the one or more valid-user time interval records (operation 316) only if the multiple unverified-user motion records respectively match with the corresponding valid-user motion records. If the secure circuit 150 determines that any unverified-user motion record does not match with the corresponding valid-user motion record, the secure circuit 150 can skip the operations 306 and 316, and proceed with the operation 320.

For another example, the secure circuit 150 may perform the operation 316 first and then respectively compare the multiple unverified-user physiological characteristics with the multiple valid-user physiological characteristics (operation 306) or respectively compare the multiple unverified-user motion records with the multiple valid-user motion records (operation 312) only if the one or more unverified-user time interval records respectively match with the corresponding valid-user time interval records. If the secure circuit 150 determines that any unverified-user time interval record does not match with the corresponding valid-user time interval record, the secure circuit 150 can skip the operations 306 and 312, and proceed with the operation 320.

In addition, as described previously, the identity authentication system 100 may adopt a challenge-response mechanism to authenticate the reality/correctness of the identity of the unverified user. In some embodiments where the physiological characteristic scanning circuit 120 is realized with capacitor-based sensors, the control circuit 140 may utilize the prompt circuit 130 to prompt the unverified user to change the surface humidity of a specific physiological characteristic to be scanned in at least one scanning course, and then provide that specific physiological characteristic to the physiological characteristic scanning circuit 120 for scanning.

For example, the prompt circuit 130 may request the unverified user to use his/her mouth to breathe out to a physiological characteristic (e.g., a specific finger indicated by the prompt circuit 130) before a certain scanning course so as to change the surface humidity of the specific finger, and then to provide the specific finger to the physiological characteristic scanning circuit 120 for scanning. In this situation, when performing the operation 306, the secure circuit 150 may conduct an appropriate simulation algorithm on the valid-user physiological characteristic corresponding to the unverified-user physiological characteristic acquired by the control circuit 140 to generate a modified physiological characteristic capable of simulating the physiological characteristic with changed surface humidity. Then, the secure circuit 150 may compare the unverified-user physiological characteristic with the modified physiological characteristic.

If the unverified-user physiological characteristic matches with the modified physiological characteristic, the secure circuit 150 would determine that the unverified-user physiological characteristic matches with the corresponding valid-user physiological characteristic. On the contrary, if the unverified-user physiological characteristic does not match with the modified physiological characteristic, the secure circuit 150 would determine that the unverified-user physiological characteristic does not match with the corresponding valid-user physiological characteristic.

It is founded from the experimental results that the changing pattern of the surface humidity of most forged physiological characteristics is very different in compared to the changing pattern of the surface humidity of the actual valid-user physiological characteristic. Therefore, it can effectively prevent the physiological characteristic forged by malicious person from passing the comparison procedure of the secure circuit 150 by adopting the aforementioned challenge-response mechanism to request the unverified user to change the surface humidity of the physiological characteristic to be scanned.

It can be appreciated from the foregoing descriptions that the secure circuit 150 not only compares the multiple physiological characteristics of the unverified user, but also compares the motion records and time interval records related to the behavior pattern of the unverified user demonstrated during the physiological characteristic scanning operations, and thus the accuracy of the user identity authentication can be greatly increased.

In the real world, it may be possible for a malicious person or computer program to steal a certain physiological characteristic of the valid user, but it would be much difficult for the malicious person or computer program to steal multiple physiological characteristics of the same valid user.

On the other hand, it is very difficult for the malicious person or computer program to obtain the details of the valid user's behavior patterns during the physiological characteristic scanning course (such as the order of providing the physiological characteristics, the cadence of providing the physiological characteristics, and/or the patterns of moving or rotating the physiological characteristic during the scanning course). Accordingly, the structure and operations of the disclosed forged-physiological-characteristic filtering device 102 can effectively reduce the possibility of identity theft caused by the malicious person or computer program, thereby improving the information security in various application environments.

In addition, by storing the valid user's key in the secured memory 152 of the secure circuit 150, it can effectively prevent the valid user's key from being stolen, thereby reducing the possibility of identity theft.

From another aspect, the structure and operations of the disclosed forged-physiological-characteristic filtering device 102 can ensure the non-repudiation of the user when conducting various operations, such as system login, data accessing, security verification, or financial transactions, and thus the disclosed forged-physiological-characteristic filtering device 102 is beneficial to reducing related disputes.

Figure 4:
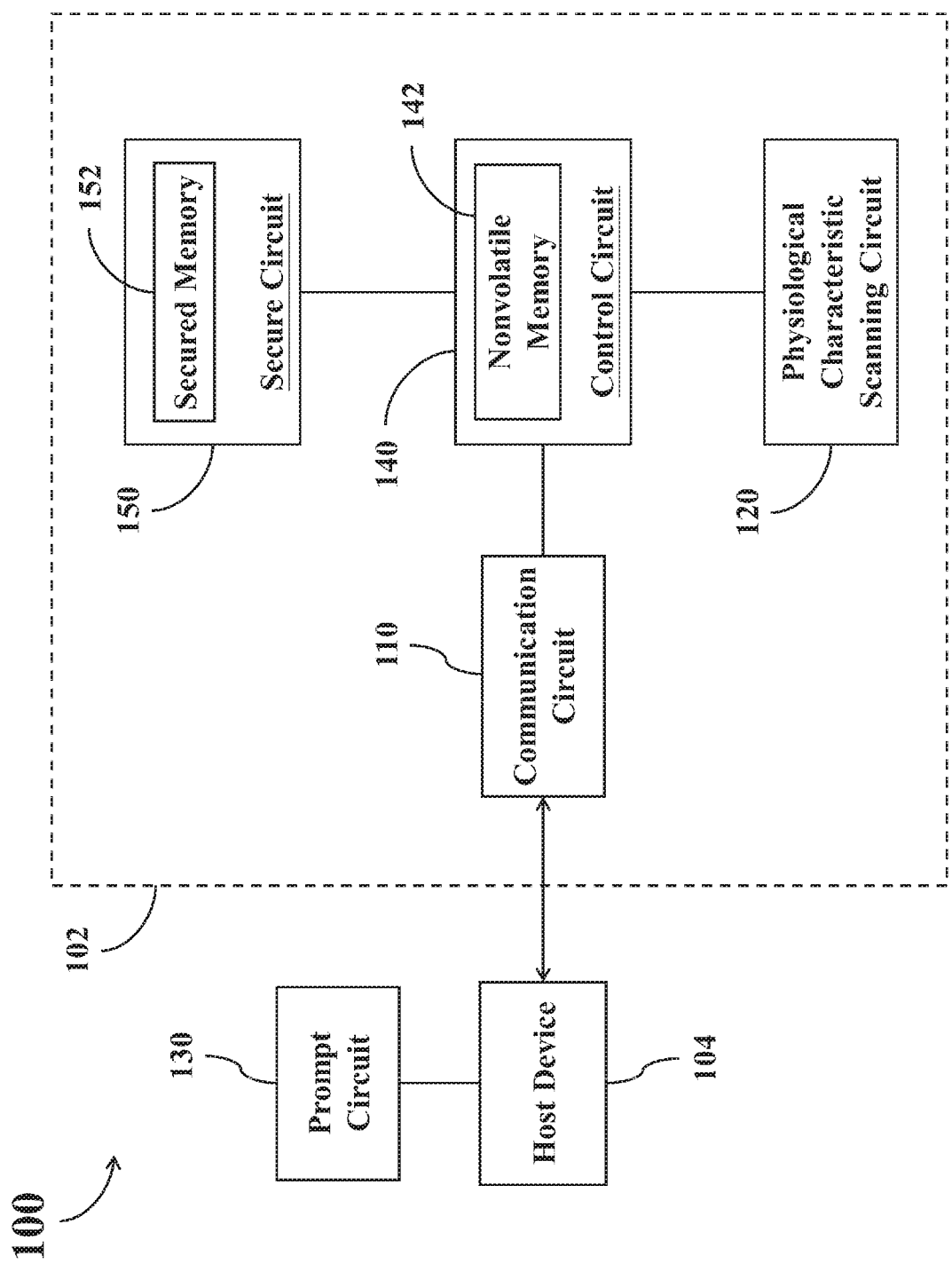
FIG. 4 shows a simplified functional block diagram of an identity authentication system according to another embodiment of the present disclosure.

Please note that the structure of the aforementioned identity authentication system 100 is merely an exemplary embodiment, rather than a restriction to the practical implementations. For example, FIG. 4 shows a simplified functional block diagram of an identity authentication system 100 according to another embodiment of the present disclosure. The embodiment of FIG. 4 is similar to the embodiment of FIG. 1, but the prompt circuit 130 in the embodiment of FIG. 4 is instead arranged outside the forged-physiological-characteristic filtering device 102 and coupled with the host device 104.

In the embodiment of FIG. 4, the operation of the prompt circuit 130 may be indirectly controlled by the control circuit 140 through the host device 104, or may be controlled by the host device 104.

The foregoing descriptions regarding the connections, implementations, operations, and related advantages of other corresponding functional blocks in the embodiment of FIG. 1 are also applicable to the embodiment of FIG. 4. For the sake of brevity, those descriptions will not be repeated here.

Additionally, in the previous embodiment, the forged-physiological-characteristic filtering device 102 comprises the secure circuit 150 which is utilized for comparing related physiological characteristics and behavior features, and for ensuring that the secret or sensitive data stored in the secure circuit 150 cannot be easily tampered. But this is merely an exemplary embodiment, rather than a restriction to the practical implementations.

In some applications where no cryptography key is used or the security concern of the secret or sensitive data is lower, the secure circuit 150 may be omitted. In this situation, the control circuit 140 may be utilized to perform the operations of the aforementioned secure circuit 150, so as to reduce the overall circuitry cost and controlling complexity.

The operations of the forged-physiological-characteristic filtering device 102 without the secure circuit 150 will be further described in the following by reference to FIG. 5 and FIG. 6.

Figure 5:
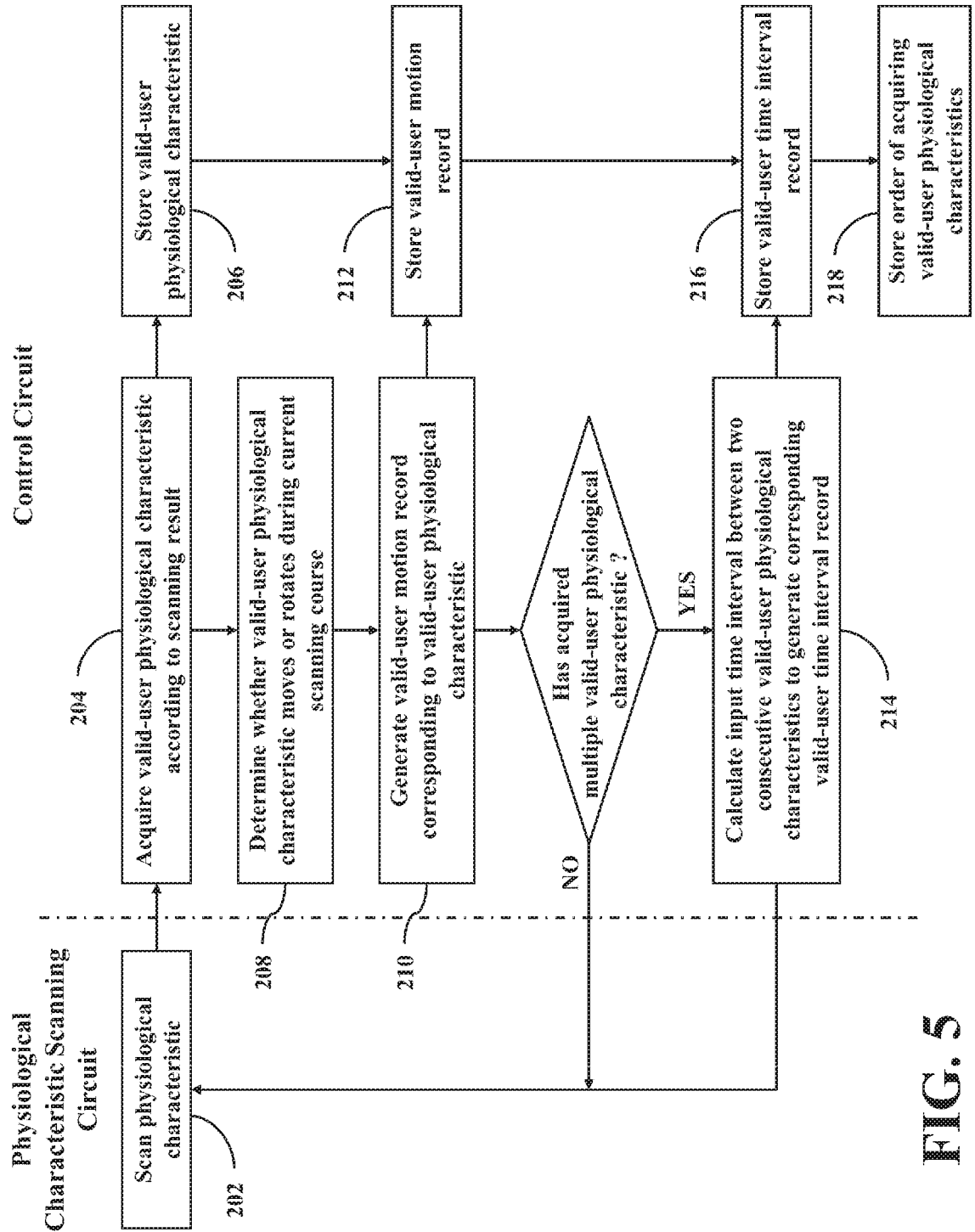
FIG. 5 shows a simplified flowchart of a method of rolling physiological characteristics according to another embodiment of the present disclosure.

Please refer to FIG. 5, which shows a simplified flowchart of a method of rolling physiological characteristics according to another embodiment of the present disclosure. As shown in FIG. 5, the operations 206, 212, 216, and 218 that are originally performed by the secure circuit 150 in FIG. 2 are instead performed by the control circuit 140 in FIG. 5. In the embodiment of FIG. 5, the control circuit 140 may utilize the nonvolatile memory 142 to play the role of the aforementioned secured memory 152, i.e., to store related data.

Figure 6:
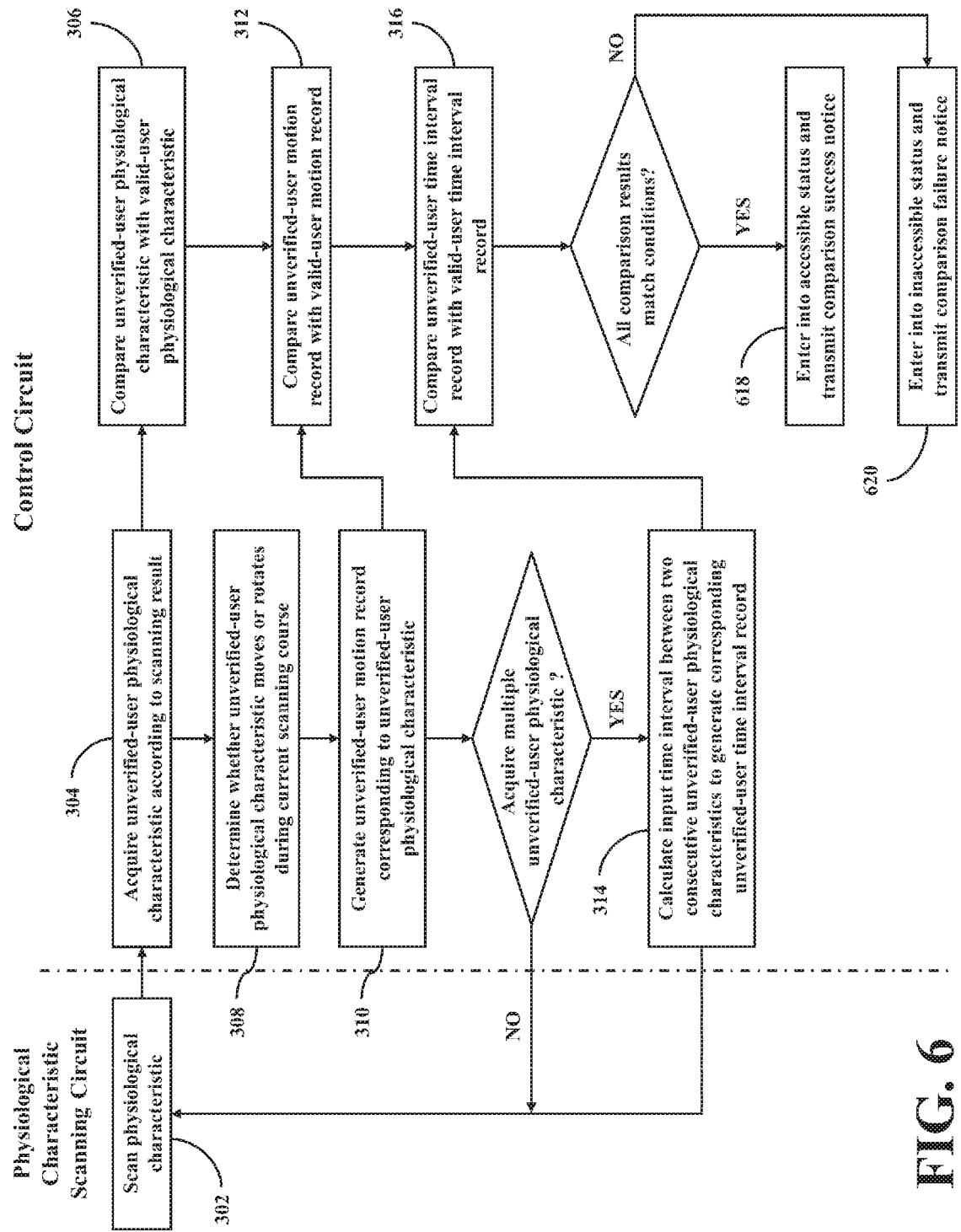
FIG. 6 shows a simplified flowchart of an identity authentication method according to another embodiment of the present disclosure.

Please refer to FIG. 6, which shows a simplified flowchart of an identity authentication method according to another embodiment of the present disclosure. As shown in FIG. 6, the operations 306, 312, and 316 that are originally performed by the secure circuit 150 in FIG. 3 are instead performed by the control circuit 140 in FIG. 6. Similarly, the control circuit 140 in the embodiment of FIG. 6 may utilize the nonvolatile memory 142 to play the role of the aforementioned secured memory 152.

Since the secure circuit 150 is omitted, the operations 318 and 320 in FIG. 3 are respectively replaced by the operations 618 and 620 in FIG. 6.

In the operation 618, the control circuit 140 enters into an accessible status.

In the operation 620, the control circuit 140 enters into an inaccessible status.

Please note that in this embodiment, the control circuit 140 is allowed to issue some sensitive user commands to the host device 104 only when the control circuit 140 stays in the accessible status. The control circuit 140 is allowed to execute some sensitive user commands transmitted from the host device 104 or to process the identity authentication request transmitted from the host device 104 only when the control circuit 140 stays in the accessible status. For example, in some embodiments, the control circuit 140 is allowed to transmit commands related to using the host device 104, commands related to activating the host device 104, commands related to accessing the host device 104, or specific data communication request to the host device 104 according to the user's manipulation only when the control circuit 140 stays in the accessible status. In this situation, the host device 104 is able to execute commands that require authenticating the user's identity again.

On the contrary, when the control circuit 140 stays in the inaccessible status, the control circuit 140 would refuse to issue some sensitive user commands to the host device 104; refuse to execute sensitive user commands transmitted from the host device 104; and refuse any identity authentication request transmitted from the host device 104. For example, in some embodiments, when the control circuit 140 stays in the inaccessible status, the control circuit 140 would not transmit commands related to using the host device 104, commands related to activating the host device 104, commands related to accessing the host device 104, or specific data communication request to the host device 104 according to the user's manipulation. In this situation, the host device 104 is unable to perform some operations that require authenticating the user's identity again.

It can be appreciated from the foregoing descriptions that the control circuit 140 not only compares the multiple physiological characteristics of the unverified user, but also compares the motion records and time interval records related to the behavior pattern of the unverified user demonstrated during the physiological characteristic scanning operations, and thus the accuracy of the user identity authentication can be greatly increased.

In the real world, it may be possible for a malicious person or computer program to steal a certain physiological characteristic of the valid user, but it would be much difficult for the malicious person or computer program to steal multiple physiological characteristics of the same valid user.

On the other hand, it is very difficult for the malicious person or computer program to obtain the details of the valid user's behavior patterns during the physiological characteristic scanning course (such as the order of providing the physiological characteristics, the cadence of providing the physiological characteristics, and/or the patterns of moving or rotating the physiological characteristic during the scanning course). Accordingly, the structure and operations of the disclosed forged-physiological-characteristic filtering device 102 can effectively reduce the possibility of identity theft caused by the malicious person or computer program, thereby improving the information security in various application environments.

From another aspect, the structure and operations of the disclosed forged-physiological-characteristic filtering device 102 can ensure the non-repudiation of the user when conducting various operations, such as system login, data accessing, security verification, or financial transactions, and thus the disclosed forged-physiological-characteristic filtering device 102 is beneficial to reducing related disputes.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The term "couple" is intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The term "and/or" may comprise any and all combinations of one or more of the associated listed items. In addition, the singular forms "a," "an," and "the" herein are intended to comprise the plural forms as well, unless the context clearly indicates otherwise.

Other embodiments of the invention will be apparent to those skilled in the art from consideration of the specification and practice of the invention disclosed herein. It is intended that the specification and examples be considered as exemplary only, with a true scope and spirit of the invention indicated by the following claims.

What is claimed is:

1. A forged-physiological-characteristic filtering device of an identity authentication system, the forged-physiological-characteristic filtering device comprising:
  a communication circuit arranged to operably communicate data with a host device in the identity authentication system;
  a physiological characteristic scanning circuit arranged to operably conduct a plurality of times of physiological characteristic scanning operations;
  a control circuit, coupled with the communication circuit and the physiological characteristic scanning circuit, arranged to operably acquire multiple unverified-user physiological characteristics and generate corresponding multiple unverified-user motion records according to scanning results of the physiological characteristic scanning circuit, and also arranged to operably calculate an input time interval between consecutive unverified-user physiological characteristics to generate one or more corresponding unverified-user time interval records, wherein the multiple unverified-user physiological characteristics comprise a first unverified-user physiological characteristic and a second unverified-user physiological characteristic, and the second unverified-user physiological characteristic is a very first physiological characteristic sensed by the physiological characteristic scanning circuit after the first unverified-user physiological characteristic escapes away from a detection range of the physiological characteristic scanning circuit;
  a prompt circuit, coupled with the control circuit, arranged to operably prompt an unverified-user to move or rotate a specific physiological characteristic being currently scanned during at least one scanning operation or to operably prompt the unverified-user to change a surface moisture of a specific physiological characteristic to be scanned before providing the specific physiological characteristic to be scanned by the physiological characteristic scanning circuit; and
  a secure circuit coupled with the control circuit and comprising a secured memory for storing a key, multiple valid-user physiological characteristics, multiple valid-user motion records, and one or more valid-user time interval records, wherein the one or more valid-user time interval records comprise a first valid-user time interval record;
  wherein the secure circuit is arranged to respectively compare the multiple unverified-user physiological characteristics with the multiple valid-user physiological characteristics, to respectively compare the multiple unverified-user motion records with the multiple valid-user motion records, and to respectively compare the one or more unverified-user time interval records with the one or more valid-user time interval records;
  wherein the control circuit is further arranged to operably calculate an input time interval between the first unverified-user physiological characteristic and the second unverified-user physiological characteristic to generate a corresponding first unverified-user time interval record; the secure circuit is further arranged to operably compare the first unverified-user time interval record with the first valid-user time interval record; and the secure circuit determines that the first unverified-user time interval record does not match with the first valid-user time interval record if a first time length corresponding to the first unverified-user time interval record is less than 70% of a first predetermined time length corresponding to the first valid-user time interval record or greater than 130% of the first predetermined time length;
  wherein the secure circuit enters into a signature-accessible status only if the multiple unverified-user physiological characteristics respectively match with corresponding valid-user physiological characteristics, the multiple unverified-user motion records respectively match with corresponding valid-user motion records, while the one or more unverified-user time interval records respectively match with corresponding valid-user time interval records;
  wherein the secure circuit is allowed to conduct encryption, decryption, or signature operation on data transmitted from the host device using the key only when the secure circuit stays in the signature-accessible status.

2. The forged-physiological-characteristic filtering device of claim 1, wherein the secure circuit enters into a signature-inaccessible status if any one of the multiple unverified-user physiological characteristics does not match with a corresponding valid-user physiological characteristic, any one of the multiple unverified-user motion records does not match with a corresponding valid-user motion record, or any one of the one or more unverified-user time interval records does not match with a corresponding valid-user time interval record;

wherein the secure circuit refuses to conduct encryption, decryption, or signature operation on data transmitted from the host device using the key when the secure circuit stays in the signature-inaccessible status.

3. The forged-physiological-characteristic filtering device of claim 1, wherein the control circuit is further arranged to operably determine whether the first unverified-user physiological characteristic moves or rotates during a physiological characteristic scanning operation of the physiological characteristic scanning circuit, and arranged to operably generate a first unverified-user motion record corresponding to the first unverified-user physiological characteristic;
wherein the first unverified-user motion record comprises at least one of the following information:
a moving direction of the first unverified-user physiological characteristic;
a moving speed of the first unverified-user physiological characteristic;
a moving distance of the first unverified-user physiological characteristic;
a portion of or a complete moving course of the first unverified-user physiological characteristic;
a rotating direction of the first unverified-user physiological characteristic;
a rotating speed of the first unverified-user physiological characteristic;
a rotating angle of the first unverified-user physiological characteristic; and
a portion of or a complete rotation course of the first unverified-user physiological characteristic.

4. The forged-physiological-characteristic filtering device of claim 1, wherein the secure circuit determines that the first unverified-user time interval record does not match with the first valid-user time interval record if the first time length is less than 85% of the first predetermined time length or greater than 115% of the first predetermined time length.

5. The forged-physiological-characteristic filtering device of claim 1, wherein the secure circuit respectively compares the multiple unverified-user motion records with the multiple valid-user motion records or respectively compares the one or more unverified-user time interval records with the one or more valid-user time interval records only in the case of that the multiple unverified-user physiological characteristics respectively match with corresponding valid-user physiological characteristics.

6. The forged-physiological-characteristic filtering device of claim 1, wherein the secure circuit respectively compares the multiple unverified-user physiological characteristics with the multiple valid-user physiological characteristics or respectively compares the one or more unverified-user time interval records with the one or more valid-user time interval records only in the case of that the multiple unverified-user motion records respectively match with corresponding valid-user motion records.

7. The forged-physiological-characteristic filtering device of claim 1, wherein the secure circuit respectively compares the multiple unverified-user physiological characteristics with the multiple valid-user physiological characteristics or respectively compares the multiple unverified-user motion records with the multiple valid-user motion records only in the case of that the one or more unverified-user time interval records respectively match with corresponding valid-user time interval records.

8. A forged-physiological-characteristic filtering device of an identity authentication system, the forged-physiological-characteristic filtering device comprising:

a communication circuit arranged to operably communicate with a host device in the identity authentication system;
a physiological characteristic scanning circuit arranged to operably conduct a plurality of times of physiological characteristic scanning operations;
a control circuit, coupled with the communication circuit and the physiological characteristic scanning circuit, arranged to operably acquire multiple unverified-user physiological characteristics and generate corresponding multiple unverified-user motion records according to scanning results of the physiological characteristic scanning circuit, and also arranged to operably calculate an input time interval between consecutive unverified-user physiological characteristics to generate one or more corresponding unverified-user time interval records, wherein the one or more valid-user time interval records comprise a first valid-user time interval record while the multiple unverified-user physiological characteristics comprise a first unverified-user physiological characteristic and a second unverified-user physiological characteristic, and the second unverified-user physiological characteristic is a very first physiological characteristic sensed by the physiological characteristic scanning circuit after the first unverified-user physiological characteristic escapes away from a detection range of the physiological characteristic scanning circuit; and
a prompt circuit, coupled with the control circuit, arranged to operably prompt an unverified-user to move or rotate a specific physiological characteristic being currently scanned during at least one scanning operation or to operably prompt the unverified-user to change a surface moisture of a specific physiological characteristic to be scanned before providing the specific physiological characteristic to be scanned by the physiological characteristic scanning circuit;
wherein the control circuit comprises a nonvolatile memory for storing multiple valid-user physiological characteristics, multiple valid-user motion records, and one or more valid-user time interval records, and the control circuit is further arranged to respectively compare the multiple unverified-user physiological characteristics with the multiple valid-user physiological characteristics, to respectively compare the multiple unverified-user motion records with the multiple valid-user motion records, and to respectively compare the one or more unverified-user time interval records with the one or more valid-user time interval records;
wherein the control circuit is further arranged to operably calculate an input time interval between the first unverified-user physiological characteristic and the second unverified-user physiological characteristic to generate a corresponding first unverified-user time interval record; arranged to operably compare the first unverified-user time interval record with the first valid-user time interval record; and arranged to operably determine that the first unverified-user time interval record does not match with the first valid-user time interval record if a first time length corresponding to the first unverified-user time interval record is less than 70% of a first predetermined time length corresponding to the first valid-user time interval record or greater than 130% of the first predetermined time length;
wherein the control circuit enters into an accessible status only if the multiple unverified-user physiological characteristics respectively match with corresponding valid-user physiological characteristics, the multiple unverified-user motion records respectively match with corresponding valid-user motion records, while the one or more unverified-user time interval records respectively match with corresponding valid-user time interval records;

wherein the control circuit is allowed to transmit particular user commands to the host device only when the control circuit stays in the accessible status.

9. The forged-physiological-characteristic filtering device of claim 8, wherein the control circuit enters into an inaccessible status if any one of the multiple unverified-user physiological characteristics does not match with a corresponding valid-user physiological characteristic, any one of the multiple unverified-user motion records does not match with a corresponding valid-user motion record, or any one of the one or more unverified-user time interval records does not match with a corresponding valid-user time interval record;

wherein the control circuit refuses to transmit the particular user commands to the host device when the control circuit stays in the inaccessible status.

10. The forged-physiological-characteristic filtering device of claim 8, wherein the control circuit is further arranged to operably determine whether the first unverified-user physiological characteristic moves or rotates during a physiological characteristic scanning operation of the physiological characteristic scanning circuit, and arranged to operably generate a first unverified-user motion record corresponding to the first unverified-user physiological characteristic;

wherein the first unverified-user motion record comprises at least one of the following information:

a moving direction of the first unverified-user physiological characteristic;

a moving speed of the first unverified-user physiological characteristic;

a moving distance of the first unverified-user physiological characteristic;

a portion of or a complete moving course of the first unverified-user physiological characteristic;

a rotating direction of the first unverified-user physiological characteristic;

a rotating speed of the first unverified-user physiological characteristic;

a rotating angle of the first unverified-user physiological characteristic; and a portion of or a complete rotation course of the first unverified-user physiological characteristic.

11. The forged-physiological-characteristic filtering device of claim 8, wherein the control circuit determines that the first unverified-user time interval record does not match with the first valid-user time interval record if the first time length is less than 85% of the first predetermined time length or greater than 115% of the first predetermined time length.

12. The forged-physiological-characteristic filtering device of claim 8, wherein the control circuit respectively compares the multiple unverified-user motion records with the multiple valid-user motion records or respectively compares the one or more unverified-user time interval records with the one or more valid-user time interval records only in the case of that the multiple unverified-user physiological characteristics respectively match with corresponding valid-user physiological characteristics.

13. The forged-physiological-characteristic filtering device of claim 8, wherein the control circuit respectively compares the multiple unverified-user physiological characteristics with the multiple valid-user physiological characteristics or respectively compares the one or more unverified-user time interval records with the one or more valid-user time interval records only in the case of that the multiple unverified-user motion records respectively match with corresponding valid-user motion records.

14. The forged-physiological-characteristic filtering device of claim 8, wherein the control circuit respectively compares the multiple unverified-user physiological characteristics with the multiple valid-user physiological characteristics or respectively compares the multiple unverified-user motion records with the multiple valid-user motion records only in the case of that the one or more unverified-user time interval records respectively match with corresponding valid-user time interval records.

* * * * *